(12) United States Patent
Berlin et al.

(10) Patent No.: US 7,482,055 B2
(45) Date of Patent: Jan. 27, 2009

(54) LAMINATED PACKAGING MATERIAL, A METHOD OF PRODUCING THE SAME, AS WELL AS A PACKAGING CONTAINER PRODUCED FROM THE PACKAGING MATERIAL

(75) Inventors: Mikael Berlin, Lund (SE); Mats Bentmar, Svedala (SE); Ulf Lindqvist, Södra Sandby (SE); Katarina Flemmer, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/491,570

(22) PCT Filed: Oct. 9, 2002

(86) PCT No.: PCT/SE02/01842
§ 371 (c)(1),
(2), (4) Date: Feb. 23, 2005

(87) PCT Pub. No.: WO03/031720
PCT Pub. Date: Apr. 17, 2003

(65) Prior Publication Data
US 2005/0129930 A1    Jun. 16, 2005

(30) Foreign Application Priority Data
Oct. 9, 2001    (SE)   .................................... 0103370

(51) Int. Cl.
B32B 5/16   (2006.01)
B32B 27/06  (2006.01)
B32B 23/04  (2006.01)
B32B 29/00  (2006.01)
B05D 3/02   (2006.01)

(52) U.S. Cl. ........................ 428/331; 428/507; 428/532; 428/533; 428/537.5; 427/372.2

(58) Field of Classification Search .................. None
See application file for complete search history.

(56) References Cited

U.S. PATENT DOCUMENTS

| 5,773,131 | A | 6/1998 | Dettling |
| 5,977,021 | A | 11/1999 | Aoyama et al. |
| 7,033,455 | B1 * | 4/2006 | Berlin et al. ........... 156/244.11 |

FOREIGN PATENT DOCUMENTS

| EP | 0761876 | 3/1997 |
| JP | 56004563 | 1/1981 |
| WO | 9404753 | 3/1994 |

* cited by examiner

Primary Examiner—Sheeba Ahmed
(74) Attorney, Agent, or Firm—Buchanan, Ingersoll & Rooney PC

(57) ABSTRACT

A laminated packaging material (10) comprising a core layer (11) and a barrier layer (14) formed from a liqueform composition comprising a dispersion or solution of a polymer, starch or starch derivative on one side of the core layer, the barrier layer also including particles of amorphous $SiO_2$. According to the invention, said particles of amorphous $SiO_2$ in colloidal particle size in said barrier layer are present in a content of above 40 weight % but below 80 weight %. The invention also relates to a packaging container which has been produced from the packaging material, as well as a method of producing the packaging material.

31 Claims, 1 Drawing Sheet

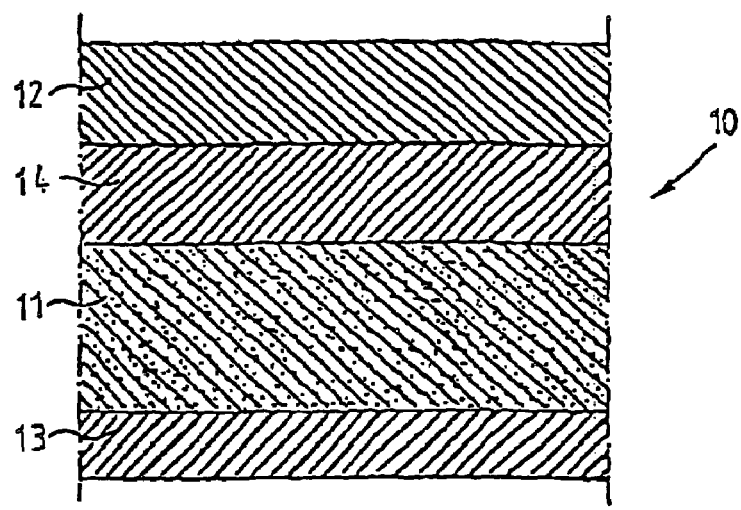
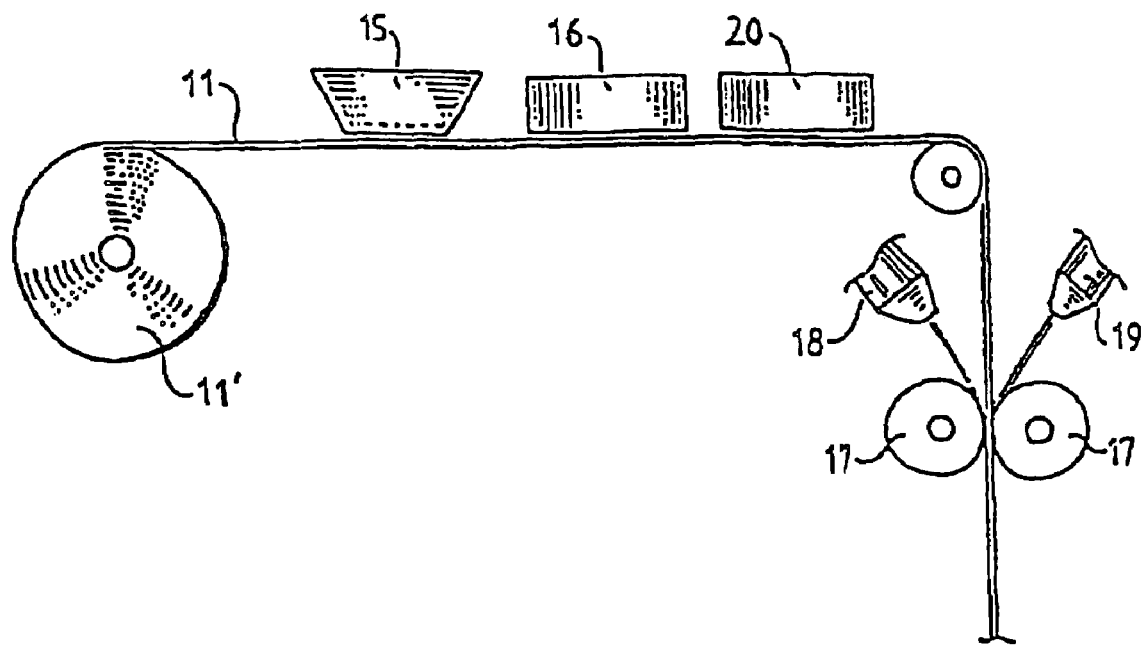

LAMINATED PACKAGING MATERIAL, A METHOD OF PRODUCING THE SAME, AS WELL AS A PACKAGING CONTAINER PRODUCED FROM THE PACKAGING MATERIAL

TECHNICAL FIELD

The present invention relates to a laminated packaging material comprising a core layer and a barrier layer formed from a liqueform barrier composition comprising a dispersion or solution of a polymer, starch or starch derivate, on one side of the core layer, the barrier layer also including particles of amorphous $SiO_2$. The present invention further relates to a packaging container which has been produced from the packaging material, as well as a method for producing the packaging material.

BACKGROUND ART

Within the packaging industry, it is well known to employ laminated packaging materials of a single-use disposable nature for the packing and transport of liquid foods. Normally, such laminated packaging material is built up from a configurationally rigid but foldable core layer, for example consisting of paper or paperboard, in order to obtain good mechanical configurational stability. Liquid-tight coatings of plastic are laid on both sides of the core layer and protect the liquid-absorbing fibres of the core layer effectively from being penetrated by moisture. These outer layers normally consist of a thermoplastic, preferably polyethylene, which moreover imparts to the packaging material superior thermo-sealing properties so that the packaging material may be converted into finished packages of the desired geometric configuration.

However, laminated packaging material which consists solely of paper or paperboard and liquid-tight plastic lacks tightness against gases, in particular oxygen gas. This is a major disadvantage in the packing of many foods whose shelf-life declines dramatically when they come into contact with oxygen gas, for example fruit juices. In order to supplement the packaging material with a barrier against gases, in particular against oxygen gas, it belongs to the prior art technology to lay on a layer possessing superior tightness to oxygen gas, for example aluminium foil or polyvinyl alcohol, on that side of the core layer which is intended to face in towards the interior of the package.

In comparison with aluminium foil, polyvinyl alcohol possesses many desirable properties, for which reason it is to be preferred as a barrier material in many contexts. Among other things, polyvinyl alcohol possesses higher mechanical strength, better compatibility with foods and is more economical, at the same time as enjoying excellent properties as an oxygen gas barrier. It has further been deemed as a suitable material, in certain cases from the environmental viewpoint or with a view to recycling and recovery to replace aluminium foil as gas barrier material in food packages.

One drawback is that polyvinyl alcohol is sensitive to moisture and rapidly loses its barrier properties when it is exposed to a damp environment. This drawback was previously obviated according to WO97/22536 in that the polyvinyl alcohol was combined with one or more per se known, food approved polymers, for example copolymers ethylene/acrylic acid (EAA) or copolymers of styrene/butadiene. These form, in combination with polyvinyl alcohol, a continuous and unitary layer with superior properties as gas barrier, in particular against oxygen gas, at the same time as the desired superior gas barrier properties of the polyvinyl alcohol are retained also in a damp environment.

While polymer gas barrier materials may impart good gas barrier properties to a packaging laminate, they are nevertheless to some extent permeable for oxygen gas, while a material of a type such as metal or glass for cans or bottles possesses an oxygen gas permeability which is practically zero. In order further to improve the gas barrier properties, it is possible to mix the polymer gas barrier material with an inorganic lamellar material. Such a polymer composition for gas barrier material is described, for example, in EP-A-O 590 263 and possesses excellent barrier properties against gas and moisture. Thus, EP-A-O 590 263 presents a method for the production of a polymer composition for a gas barrier material, or the formed product, e.g. a film, the composition including a polymer and an inorganic lamellar material with a particle size of 5 μm or less and a quantity relationship of 50-5000, and the method comprises the step that the inorganic laminate material is dispersed in a polymer or a polymer solution in such a state that the inorganic lamellar material swells or shears up in a solvent/dispersion agent, whereafter this is removed from the dispersion when necessary in the form of a film, at the same time as the lamellar material remains in the swollen state.

From JP 56004563 is also known a plastic material which, with a view to attaining superior gas and moisture barrier properties, has been coated with a film of polyvinyl alcohol (PVOH) and $SiO_2$. The relationship $SiO_2$/PVOH may be 5/95-80/20. It is also disclosed that the size of the $SiO_2$ particles does not constitute a limitation but that they should have an average diameter of below 100 micron. It is further disclosed that an aqueous dispersion which contains PVOH and $SiO_2$ is utilised for the coating and that thermocuring may be carried out, for example during a period of time of up to an hour in a temperature of 80-200° C.

According to JP10-001515, the intention is to crosslink the main chains in PVOH by means of $SiO_2$. The purpose is, in a laminate with a core layer of paperboard, to improve gas barrier properties despite a damp and humid environment.

WO 99/44826 describes a laminate with a core layer of biaxially oriented polypropylene. An outer layer may consist of a homo- or copolymer of a vinyl alcohol which may include an "antiblocking agent". Such an "antiblocking agent" may consist of spherical $SiO_2$ particles of the order of magnitude of 1-6 μm, in a quantity of 0.1-2 weight %.

EP 761 876 describes a packaging laminate for, for example, a package for liquid foods, the laminate being built up with a core of paperboard. A coating layer on the paperboard, the coating layer including PVOH and amorphous $SiO_2$ has for its purpose to act as a moisture and aroma barrier.

WO 00/40404 describes a thermoplastic film intended for the packing of food products, e.g. by wrapping them in a transparent film, but not intended for the production of dimensionally stable packages for liquid foods. The film according to WO 00/40404 has a coating layer on at least one surface thereof, the coating layer including a polymer binder or adhesive and an additive including nanoparticles of, for example, $SiO_2$. It is disclosed that the nanoparticles preferably constitute 5 to 20 weight % of the additive, and that the additive constitutes 40 to 90 weight % of the coating.

BRIEF SUMMARY OF THE INVENTION

The present invention has for its object, in comparison with prior art technology, to further optimise the gas barrier properties in a layer which is formed from a liqueform composition comprising a dispersion or solution of a polymer, starch or starch derivate and particles of amorphous $SiO_2$. In particular, the present invention has for its object, in such a layer, to attain increased oxygen gas barrier and increased liquid resistance. The reason for this is that it has been found, in connection with the evolution of the present invention, that a surprisingly good effect may be attained in certain selective criteria for the composition of the layer. According to the present invention, such an optimated layer is intended to be employed in a laminate packaging material possessing excellent barrier properties, in particular against gases, the packaging material in turn being intended to be employed in a package possessing excellent barrier properties.

It is also an object of the present invention to realise a laminated packaging material possessing improved rigidity.

The packaging material which is provided with a layer of the oxygen gas barrier comprising polymer, starch or starch derivate and $SiO_2$ according to the present invention may include a core layer, i.e. that layer which makes the greatest contribution to the thickness of the material and to its mechanical properties, the core layer consisting of a layer of paper or paperboard or a layer of a polymer material.

The selective criteria requisite for the improved barrier effect and rigidity are accounted for in appended claim 1, relating to a laminate packaging material. The claims relating to a method for the production thereof, as well as a packaging container produced from the packaging material also account for these selective criteria.

According to the present invention, a barrier layer comprising a water dispersible or soluble polymer, starch or starch derivate and amorphous $SiO_2$ will thus be optimised in terms of the quantity of $SiO_2$ in the layer and also the particle size of the $SiO_2$ particles. It has also proved that the selected type of $SiO_2$ particles, as well as possibly the configuration of the $SiO_2$ particles may have an effect on the barrier properties, there being indications that the configuration should be spherical or substantially spherical. However, it may not be ruled out that other configurations may also give the effect according to the present invention. According to the present invention, it has surprisingly proved that considerably better barrier properties in respect of oxygen gas may be attained than those barrier properties which could be expected on the basis of an accepted calculation model for the influence on filler agent in an oxygen gas barrier layer. It has further surprisingly proved that the addition of $SiO_2$ particles in the barrier layer gives a considerable increase in rigidity in the laminate.

Without locking the present invention to any given theory in respect of increased oxygen gas barrier, it is assumed that the colloidal particles of $SiO_2$ function as a seedbed for the crystalline growth of the polymer, with improved crystallinity as a result and thereby improved oxygen gas barrier effect, as well as improved resistance to liquids. However, theories are yet to be established concerning the reason for the optimum which has been found in certain quantities of $SiO_2$ and certain particle sizes—the results are truly surprising.

The barrier layer according to the present invention may be utilised for improved barrier properties in packaging laminates of conventional type, with conventional surface weights or grammage of the barrier layer and/or may be utilised for retained barrier properties in a packaging laminate of known type, with lower surface weights or grammage than previously.

In addition to those advantages already mentioned, the present invention entails that the improved liquid resistance and increased oxygen gas barrier in the layer of polymer, starch or starch derivate and $SiO_2$ can be attained without increased costs, since the silica is normally not more expensive than the polymer, starch or starch derivate. Furthermore, the advantage will be afforded that the total solids of the dispersion can be increased without a deterioration in viscosity (i.e. without viscosity increasing). This is an advantage since it implies less drying energy at the same time as good properties for application of the layer are maintained. At, for example, a 60% admixture of silica, the total solids may be increased from 10% to 18%, from 12% to 20.7% or from 15% to 24% with retained viscosity. In addition, the advantage will further be attained that layers of aluminium foil or other gas barrier layers apart from that layer according to the present invention, may be avoided in the packaging laminate.

DETAILED DESCRIPTION OF THE INVENTION

The barrier layer comprises more than 40 weight %, preferably more than 45 weight %, even more preferably more than 50 weight % and most preferably more than 55 weight % but less than 80 weight %, preferably less than 75 weight %, even more preferably less than 70 weight % and most preferably less than 65 weight % of particles of amorphous, colloidal $SiO_2$, calculated on dry weight. In the examples, the selective effect which is achieved in the preferred contents of $SiO_2$ is accounted for.

The lower limit for the particle size of the $SiO_2$ particles is determined in practice by how small particles it is possible to manufacture. Consequently, the particle size is at least 3 nm, preferably at least 4 nm and even more preferably at least 5 nm, even though even smaller particles could be utilised if they could be manufactured. The upper limit is set by the fact that the particles must be able to be present in a stable colloidal sol. Consequently, the particle size is at most 150 nm, preferably at most 100 nm and most preferably at most 70 nm.

It has further proved that also the type of $SiO_2$ particles is of importance for the effect according to the present invention. Eka Chemicals within the Akzo Nobel group markets colloidal $SiO_2$ sols under the trade mark Bindzil® as well as Nyacol®, of which at least a part is particularly suitable for utilisation in connection with the present invention. These sols include $SiO_2$ particles in the above-disclosed size range in contents of 7-50 weight % and display viscosities of at most 50 MPas, in most cases at most 20 MPas. The Bindzil type further displays a specific area weight of between 80 and 500 $m^2/g$.

According to one aspect of the present invention, said polymer dispersion or solution is based on a polymer which includes functional hydroxyl groups or functional carboxyl groups.

According to another aspect of the present invention, the dispersible or soluble polymer preferably consists of a polymer which per se displays oxygen gas barrier properties.

According to still a further aspect of the present invention, the dispersible or soluble polymer, starch or starch derivate instead consists of a polymer, starch or starch derivate which per se does not display any appreciable oxygen gas barrier property, the oxygen gas barrier property being achieved by means of the admixture of $SiO_2$ particles according to the present invention.

Most preferably, said polymer dispersion or solution is based on a polymer in the group essentially comprising ethylene acrylic acid copolymers, ethylene methacrylic acid copolymers, ethyl vinyl acetate copolymers, ethylene vinyl alcohol copolymers, modified ethylene copolymers, polyvinyl alcohol, styrene copolymers and combinations thereof. However, the present invention is not restricted to these polymers but other dispersible or soluble polymers are also conceivable, in addition to starch or starch derivate.

An additive, for example a dispersion-stabilising agent, may also be included in the gas barrier composition, preferably in a quantity which does not exceed about 1 weight percent of the dry coating.

In the preferred case that the polymer consists of polyvinyl alcohol, this should display a degree of hydrolysis of at least 98%, and a mol. weight of between 16000 g/mol and 200000 g/mol.

According to yet a further aspect of this preferred embodiment of the present invention, the composition for the barrier layer, in addition to polyvinyl alcohol and particles of $SiO_2$, may also include ethylene acrylic acid copolymer (EAA) and/or inorganic lamellar material, so called nanoparticles. The EAA copolymer should preferably be included in the barrier layer in the proportion of approx. 1-20 weight %, calculated on the dry weight of the coating. A possibly utilised inorganic lamellar material should display those features which are accounted for in WO 00/01715. Also in cases of other polymers, starch or starch derivates according to the foregoing, the inorganic lamellar material may be utilised correspondingly.

It has, however, also highly surprisingly proved that EAA as sole polymer can give an oxygen gas barrier effect together with the $SiO_2$ particles according to the present invention, and this despite the fact that EAA does not display any appreciable oxygen gas barrier properties in itself.

The core layer in the packaging material preferably consists of paper or paperboard, normally of a surface weight or grammage of approx. 100-500 g/m$^2$, preferably approx. 200-300 g/m$^2$. However, it is also conceivable that the core layer may consist of a polymer material, preferably with a corresponding surface weight or grammage.

The barrier layer is preferably applied as a liquid film of a water-based composition, comprising a dispersion or solution of polymer, starch or starch derivate, as well as particles of $SiO_2$.

The barrier layer is preferably laid direct on the core layer or on a carrier layer using a coating technology, in a surface weight of about 1 to 10 g/m$^2$, more preferably about 1 to 8 g/m$^2$, most preferably about 1 to 5 g/m$^2$, calculated on dry weight. If the applied layer is too thin, the gas barrier properties may by too poor and if it is to thick there is a risk that the barrier layer will become rigid and that cracks will be formed therein.

In that case when a carrier barrier is utilised for the formation of the barrier layer according to the present invention, this may consist of paper or plastic or plastic coated paper. If paper is employed, it is preferably thin. According to one alternative, the carrier layer preferably consists of paper of a surface weight or grammage of approx. 5-35 g/m$^2$, for example 7-25 g/m$^2$, more preferably approx. 10-20 g/m$^2$.

The carrier layer with the barrier layer and the core layer may be united in different ways in accordance with that described in WO 00/01715.

According to another embodiment of the present invention, the barrier layer according to the present invention may be laminated to the core layer by the intermediary of an interjacent polymer layer. Such an interjacent layer, for example a polyethylene, may be applied on the core layer in a first step, preferably by means of extrusion, whereafter the gas barrier layer is applied on the interjacent layer in a second step.

According to still a further aspect of the present invention, an extremely good liquid resistance in the barrier layer will also be attained without heat treatment thereof, at least in cases of polyvinyl alcohol as polymer, and a surprisingly good resistance to liquid is achieved after heat treatment. It is, therefore, to be preferred that heat treatment be carried out on the barrier layer, once this has been applied on the core layer or on a carrier, and dried. The web surface temperature for the heat treatment (the curing) is preferably at least 170° C. and even more preferably at least 200° C., in which event the time elapsed should be as short as possible, typically of the order of magnitude of milliseconds, e.g. at most 100 ms and preferably at most 50 ms.

Most preferably, the material comprising the polymer, the starch or starch derivate and particles of $SiO_2$ is first dried at web surface temperatures of 80 to 160° C. (preferably 140-160° C.) in a first step, followed by curing at web surface temperatures of 170 to 230° C. in a second step, which gives rise to an improved gas barrier at 80% RH. Possibly, the carrier material and the barrier material may be cooled between the two steps.

Preferably, the packaging laminate includes a polymer layer, preferably thermoplastic, e.g. polyethylene, laminated directly on the gas barrier layer. Preferably, this plastic is LDPE. Other thermoplastics which may be employed are other types of polyethylene (among others LLDPE, ULDPE, VLDPE, M-PE and HDPE), polypropylene and polyethylene terephthalate.

On the other side of the core layer, i.e. that side which is intended to constitute the outside in the packaging container, there may be provided one or more other layers, including a layer for thermosealing, e.g. of one of the previously mentioned thermoplastics.

According to still a further aspect of the present invention, a packaging container is also proposed which is produced by fold formation of a sheet or web of laminated packaging material according to the present invention.

BRIEF DESCRIPTION OF THE ACCOMPANYING DRAWINGS

The present invention will now be described in greater detail hereinbelow, with reference to one preferred embodiment and with reference to the accompanying Drawings. In the accompanying Drawings:

FIG. 1 schematically shows a cross section of a laminated packaging material according to one preferred embodiment of the present invention; and FIG. 2 schematically illustrates a method of producing the laminated packaging material according to the present invention.

DESCRIPTION OF PREFERRED EMBODIMENT

It should first be observed that the packaging material which is shown in FIG. 1 by no means limits the scope of the present invention, but is merely intended to illustrate a conceivable, extremely simple, embodiment of the invention. Thus, the number of layers in the packaging laminate may be varied, and also their composition may be varied freely in accordance with the desired end product.

Referring to the Drawing, FIG. 1 schematically shows a cross section of a laminate packaging material according to the present invention which is generically designated 10. In the illustrated, simple, case, the laminated packaging material comprises a core layer 11 of fibre material or other suitable material, for example polymer material.

Examples of fibre material consist of paper or paperboard of conventional quality for packaging laminates, while examples of suitable polymer materials for the core layer 11 consist of polyolefin, e.g. polyethylene, polypropylene and copolymers, olefin monomers, polyester, polyamide etc. In the case where the core layer 11 consists of a polymer material, this material may display a homogeneous, solid structure or may also consist of a foamed or expanded polymer. The polymer material may also consist of a filled polymer.

On both sides of the core layer 11, there are disposed outer, liquid-tight coating layers 12, 13 of plastic, which not necessarily but preferably consist of extrudable thermoplastic, e.g. polyethylene, in accordance with the foregoing. These layers also act as sealing layers for thermosealing by means of conventional methods.

Between the core layer 11 and the one outer, liquid-tight coating layer 12, there is provided a layer of a polymer, starch or starch derivate in accordance with the foregoing, dispersible or soluble in water, in this preferred case, polyvinyl alcohol (PVOH), which, according to the invention, contains an optimated content of $SiO_2$ particles in accordance with the foregoing.

The packaging laminate 10 illustrated in FIG. 1 may, according to the present invention, be produced in the manner which is schematically illustrated in FIG. 2.

A web 11 of paper, paperboard or polymer material is unrolled from a magazine reel 11' and is led past an applicator 15, preferably a coater, which is disposed adjacent the web and by means of which a solution or dispersion of polyvinyl alcohol including $SiO_2$ is applied on the one side of the web 11 in the form of a substantially continuous barrier layer 14. It is generally known within the art that coating facilitates the formation of very thin layers in comparison with, for example, extrusion. By coating, well-formed layers which are as thin as 1 μm can be realised, while layers thinner than about 5 μm cannot be realised by extrusion.

The web 11 is thereafter led further past a drying apparatus 16 which acts on the coated side of the web 11, e.g. in the form of an infrared dryer or a hot air unit for driving off water and drying the applied layer 14.

Preferably, the dried web is thereafter heated up to at least 170° C. in a heat treatment unit 20 for curing the layer 14. The time for the curing treatment may be extremely brief, corresponding to normally employed web speeds. The curing by heat treatment also results in considerably improved adhesion or bonding between the barrier layer 14 and the core layer 11 or an interjacent layer.

The coated, dried and cured web 11 is finally led through a nip between two rotating rollers 17, at the same time as thin plastic films 12 and 13 are extruded on both sides of the web 11, with the aid of extruders 18 and 19 for forming the finished packaging laminate 10 according to the present invention.

From a sheet or a web-shaped packaging laminate 10 which, in a per se known manner, has been provided with crease lines which facilitate fold forming, packages are formed in a per se known manner by rational forming, filling and sealing technology (not shown). From, for example, a web of the packaging laminate 10, packaging containers may be produced in automatic packing and filling machines in such a manner that the web unwound from the magazine reel is reformed into a tube by the edges of the web being united in an overlap seal or joint, whereafter the thus formed tube is filled with the intended contents and divided into individual packaging containers by repeated transverse seals disposed in spaced apart relationship from one another and at right angles to the tube. Once the supplied contents have thus been enclosed in sealed sections of the tube, these sections are separated from the tube by incisions in the above mentioned transverse sealing zones. The severed tube sections are thereafter formed by folding along crease lines provided in the packaging material to form packaging containers of the desired configuration, e.g. parallelepipedic configuration.

EXAMPLE 1

The purpose of the initial experiment was to compare actual effect of the addition of colloidal $SiO_2$ on the oxygen gas barrier in a barrier layer of PVOH in comparison with calculated effect in a filled polymer. The calculation model takes into account quantity and dimensions of particles (any whatever), in a filled polymer, and gives an estimation of expected oxygen gas permeability:

$$P_{filled}=P_{polymer}(1+(length/2*height)*volume\ fraction)$$

This calculated oxygen gas permeability was thus compared with actual oxygen gas permeability in a barrier layer. For the barrier layer, polyvinyl alcohol was mixed with colloidal silica in the quantities 5, 50, 60 and 80 weight %, which corresponds to volume fractions of 0.03, 0.35, 0.45 and 0.7, respectively. The silica particles displayed a particle size (spherical) of 40 nm, i.e. corresponding to 40 nm Length and 40 nm height in the calculation model. The polyvinyl alcohol displayed a degree of hydrolysis of 99% and a mol. weight of 90000 g/mol. The mixture was coated on 36 μm OPET film to a 5 μm thick layer (dry calculated) and dried at 150° C., whereafter the dried coating layer was heat treated for 4 minutes at 200° C.

Table 1 presents a comparison between calculated and actual effect on oxygen gas permeability at 23° C. and 83% RH. As will be apparent, a surprisingly good result is obtained at the measurement points 50 and 60 weight %, i.e. oxygen gas transmissions which are greatly less than those expected from the calculation model.

TABLE 1

| Oxygen gas transmission PVOH ($cm^3/m^2$ * 24 h, 1 atm.) | $SiO_2$ weight % | Calculated oxygen gas transmission ($cm^3/m^2$ * 24 h, 1 atm.) | Observed oxygen gas transmission ($cm^3/m^2$ * 24 h, 1 atm.) |
| --- | --- | --- | --- |
| 7.0 | 5 | 7.0 | 7.1-7.2 |
| 7.0 | 50 | 6.0 | 2.5-3.0 |
| 7.0 | 60 | 5.8 | 1.2-2.0 |
| 7.0 | 80 | 5.2 | 76-80 |

EXAMPLE 2

In a series of experiments, a series of samples was prepared in which an aqueous solution of 10 weight percent PVOH was heated to 60° C. and mixed with an aqueous dispersion at room temperature of $SiO_2$ particles of the type Bindzil® 40/170 from Eka Chemicals. The polyvinyl alcohol displayed a degree of hydrolysis of 99%, a viscosity of 15% at 20° C. in 4% solution and a mol. weight of 90000 g/mol. The mixture was mixed for 4 minutes at 10000 rpm. After the mixing, the mixture was allowed to stand to the following day. The thus obtained mixture was employed for dispersion coating for the formation of a 5 μm layer (dry calculated) on a 36 μm OPET film, the film being dried at 150° C. The samples were cured for 4 minutes at 200° C. Measured oxygen gas transmission for different contents of $SiO_2$ (dry calculated) is presented in table 2. The results constitute a mean value of two experiments and show that, in contents of $SiO_2$ up to 40 weight %, the oxygen gas barrier properties were not improved, but on the contrary deteriorated. Between 50 and 70 weight % occurs a surprising effect, the oxygen gas transmission falling drastically. Best results were obtained at about 60 weight % $SiO_2$. At 80 weight %, no oxygen gas barrier effect was achieved at all.

The obtained oxygen gas transmission has been analysed at about 83% RH in the experiments, i.e. a relatively humid atmosphere. The good results which occur despite this humid atmosphere show that the gas barrier layer according to the present invention displays extremely good resistance to liquid, simultaneously with good gas barrier properties, which possibly, but not indisputably, may depend upon a higher level of crystallinity in the polyvinyl alcohol.

TABLE 2

| $SiO_2$ (%) | Oxygen gas transmission ($cm^3/m^2$ * 24 h, 1 atm.) |
|---|---|
| 0 | 6.3 |
| 10 | 7.1 |
| 20 | 9.2 |
| 30 | 8.1 |
| 40 | 6.0 |
| 50 | 3.7 |
| 60 | 1.3 |
| 65 | 2.5 |
| 70 | 3.5 |

EXAMPLE 3

In an experiment series, a series of samples was prepared in the same manner as in example 2. Measured oxygen gas transmission for different types and contents of $SiO_2$ (dry calculated) is presented in table 3. The results constitute mean values of two experiments and substantiate the illustrated optimum at about 50-70 weight %. Also in the admixture of nanoparticles of inorganic lamellar material, the desired effect is attained. At the same time, the result shows that it is not all types of $SiO_2$ particles which give the desired effect. For example, Eka Np 090 gives a poorer oxygen gas barrier compared with the reference, as does likewise Bindzil NH3 30/220. On the other hand, with Bindzil 50/80 the effect according to the present invention is attained. (In the designation XX/YYY in the Bindzil products, XX constitutes the weight % $SiO_2$ in the silica sol which is mixed together with the polyvinyl alcohol, while the designation YYY constitutes the specific area weight in $m^2/g$ $SiO_2$ particles.)

TABLE 3

| $SiO_2$ | Oxygen gas transmission, $cm^3/m^2/24$ h/5 μm $P = 1$ atm |
|---|---|
| Non | 6.7 |
| 5% Bindzil 40/170 | 7.3 |
| 50% Bindzil 40/170 | 2.8 |
| 60% Bindzil 40/170 | 1.3 |
| 70% Bindzil 40/170 | 3.5 |
| 80% Bindzil 40/170 | No barrier |
| 50% Bindzil 40/170 + 10% nanoparticles | 1.9 |
| 50% Eka Np 090 | 9.8 |
| 50% Bindzil 50/80 | 3.7 |
| 60% Bindzil NH3 30/220 | 11.0 |
| 65% Bindzil NH3 30/220 | 27.4 |
| 70% Bindzil NH3 30/220 | 31.2 |

EXAMPLE 4

Dispersions of ethylene acrylic acid copolymer (EAA) (Epotal 2343, BASF, Germany) and $SiO_2$ particles were mixed together. The resulting dispersions were applied on OPET film (Melinex 800, Du Pont, 36 μm) in a Hirano lab coater (1 m/min) and dried at 150° C. The coating thickness was 5 μm dry. Table 4 shows the resulting oxygen gas barrier in the coating (the barrier effect of the OPET film has been discounted in the calculation). The result surprisingly shows that EAA, which has no appreciable oxygen gas barrier effect per se, achieves oxygen gas barrier effect when mixed with $SiO_2$ particles according to the present invention.

TABLE 4

| Sample | Particles/ Polymer, %/% | % RH | Oxygen gas transmission, $cm^3/m^2/24$ h/5 μm $P = 1$ atm |
|---|---|---|---|
| Epotal Reference | —/100 | 50 | No barrier |
| Bindzil/Epotal (40/170) | 40/60 | 50 | 419 |
| Bindzil/Epotal (40/170) | 50/50 | 50 | 648 |
| Bindzil/Epotal (30/220) | 50/50 | 50 | 648 |
| Bindzil/Epotal (30/220) | 60/40 | 50 | 1332 |

EXAMPLE 5

Dispersions of PVOH and $SiO_2$ particles were mixed together. The resulting dispersions were applied on paperboard and thereafter dried. Table 5 shows the resulting flexural rigidity in paperboard which had been coated with these dispersions in a comparison with coating solely with PVOH. The result shows a surprising increase in rigidity in the machine direction (MD) of the paperboard. In the cross direction (CD) no appreciably improved rigidity was noted however.

TABLE 5

| Sample | Particles/ Polymer, %/% | Coating, $g/m^2$ | Flexural rigidity, mN | | Increase in flexural rigidity, mN/g | |
|---|---|---|---|---|---|---|
| | | | MD | CD | MD | CD |
| Paperboard Reference | — | — | 333.5 | 145.9 | — | — |
| PVOH Reference | —/100 | 3.4 | 337.4 | 157.2 | 1.1 | 3.3 |
| PVOH/Bindzil (40/170) | 30/70 | 7.2 | 349.6 | 158.8 | 2.2 | 1.8 |
| PVOH/Bindzil (40/170) | 40/60 | 7.5 | 347.8 | 168.9 | 1.9 | 3.1 |
| PVOH/Bindzil (40/170) | 50/50 | 9.1 | 376.0 | 173.6 | 4.7 | 3.1 |
| PVOH/Bindzil (40/170) | 60/40 | 11.5 | 379.8 | 193.6 | 4.0 | 4.2 |
| PVOH/Bindzil (30/220) | 30/70 | 8.1 | 361.2 | 168.4 | 3.4 | 2.8 |
| PVOH/Bindzil (30/220) | 40/60 | 7.6 | 370.8 | 170.4 | 4.9 | 3.2 |
| PVOH/Bindzil (30/220) | 50/50 | 11.4 | 364.9 | 171.4 | 2.8 | 2.2 |
| PVOH/Bindzil (30/220) | 60/40 | 10.7 | 379.2 | 176.2 | 4.3 | 2.8 |

The present invention is not restricted to the embodiments described in the foregoing, but may be varied without departing from the scope of the appended claims.

What is claimed is:

1. A laminated packaging material comprising a core layer and a barrier layer formed from a liqueform composition comprising a dispersion or a solution of a polymer, starch or starch derivate, on one side of the core layer, the barrier layer also including particles of amorphous $SiO_2$, wherein said particles of amorphous $SiO_2$ are present in colloidal particle size in said barrier layer in a content above 40 weight % but below 80 weight %, wherein said particles of amorphous, colloidal $SiO_2$ have a particle size of at least 3 nm and at most 150 nm, and wherein said particles of amorphous, colloidal $SiO_2$ have a specific area weight of 80-170 $m^2/g$, wherein said dispersion or solution is formed from a polymer which comprises functional hydroxyl groups or functional carboxyl groups, wherein said core layer consists of a layer of paper or paperboard, and wherein the laminate packaging material further comprises outer, liquid-tight coatings of polymer material.

2. The laminated packaging material as claimed in claim 1, wherein said particles of amorphous, colloidal $SiO_2$ are present in said barrier layer in a content above 45 weight %, but below 75 weight %.

3. The laminated packaging material as claimed in claim 2, wherein said particles of amorphous, colloidal $SiO_2$ are present in said barrier layer in a content above 50 weight % and below 70 weight %.

4. The laminated packaging material as claimed in claim 3, wherein said particles of amorphous, colloidal $SiO_2$ are present in said barrier layer in a content above 55 weight % and below 65 weight %.

5. The laminated packaging material as claimed in claim 1, wherein said particles of amorphous, colloidal $SiO_2$ have a particle size of at least 4 nm and at most 100 nm.

6. The laminated packaging material as claimed in claim 5, wherein said particles of amorphous, colloidal $SiO_2$ have a particle size of at least 5 nm and at most 70 nm.

7. The laminated packaging material as claimed in claim 1, wherein said dispersion or solution is based on a polymer selected from the group consisting of ethylene acrylic acid copolymers, ethylene methacrylic acid copolymers, ethylene vinyl acetate copolymers, ethylene vinyl alcohol copolymers, modified ethylene copolymers, polyvinyl alcohol, styrene copolymers, and combinations thereof.

8. The laminated packaging material as claimed in claim 1, wherein said barrier layer a surface weight, dry calculated, of about 1-10 $g/m^2$.

9. The laminated packaging material as claimed in claim 6, wherein said barrier layer has a surface weight, dry calculated, of about 1-8 $g/m^2$.

10. The laminated packaging material as claimed in claim 9, wherein said barrier layer has a surface weight, dry calculated, of about 1-5 $g/m^2$.

11. The laminated packaging material as claimed in claim 1, wherein the outer, liquid-tight coatings are of a thermoplastic polymer material.

12. The laminated packaging material as claimed in claim 1, wherein said barrier layer is in direct contact with said core layer and well integrated therewith, throughout substantially all of their surfaces facing towards one another.

13. The laminated packaging material as claimed in claim 1, wherein said barrier layer is indirectly applied against said core layer and well integrated therewith, throughout substantially all of their surfaces facing towards one another, an interjacent layer of a polymer material being disposed between them.

14. A packaging container suitable for containing foods, wherein it is formed from a laminate packaging material as claimed in claim 1.

15. A method of producing a laminated packaging material comprising a core layer and a barrier layer formed from a liqueform composition comprising a dispersion or solution of a polymer, starch or starch derivate, on one side of the core layer, the barrier layer also including particles of amorphous $SiO_2$, the process comprising applying a barrier layer of a liqueform composition comprising a dispersion or solution of a polymer, starch or starch derivate, including said particles of amorphous $SiO_2$ which have colloidal particle size, in a content of above 40 weight % but below 80 weight % dry calculated, on one side of the core layer, wherein said particles of amorphous, colloidal $SiO_2$ have a particle size of at least 3 nm and at most 150 nm, and wherein said particles of amorphous, colloidal $SiO_2$ have a specific area weight of 80-170 $m^2/g$, wherein said dispersion or solution is formed from a polymer which comprises functional hydroxyl groups or functional carboxyl groups, wherein said core layer consists of a layer of paper or paperboard, and wherein the laminate packaging material further comprises outer, liquid-tight coatings of polymer material.

16. The method as claimed in claim 15, wherein said barrier layer includes said particles of amorphous, colloidal $SiO_2$ in a content above 45 weight % but below 75 weight %.

17. The method as claimed in claim 16, wherein said barrier layer includes said particles of amorphous, colloidal $SiO_2$ in a content above 50 weight % and below 70 weight %.

18. The method as claimed in claim 17, wherein said barrier layer includes said particles of amorphous, colloidal $SiO_2$ in a content above 55 weight %, and below 65 weight %.

19. The method as claimed in claim 15, wherein said particles of amorphous, colloidal $SiO_2$ are spherical or substantially spherical.

20. The method as claimed in claim 15, wherein said dispersion or solution is based on a polymer selected from the group consisting of ethylene acrylic acid copolymers, ethylene methacrylic acid copolymers, ethylene vinyl acetate copolymers, ethylene vinyl alcohol copolymers, modified ethylene copolymers, polyvinyl alcohol, styrene copolymers and combinations thereof.

21. The method as claimed in claim 15, wherein said barrier layer is applied with a surface weight, dry calculated, of about 1-10 $g/m^2$.

22. The method as claimed in claim 21, wherein said barrier layer is applied with a surface weight, dry calculated, of about 1-8 $g/m^2$.

23. The method as claimed in claim 22, wherein said barrier layer is applied with a surface weight, dry calculated, of about 1-5 $g/m^2$.

24. The method as claimed in claim 15, wherein said barrier layer is applied in the form of a liquid film of a liquid barrier composition, by means of a coating process.

25. The method as claimed in claim 15, wherein said barrier layer is applied in the form of a liquid film of a liquid barrier composition, on at least one side of a carrier layer and is dried during heating, whereafter the carrier layer with the applied, dried barrier layer is combined and permanently united with one side of the core layer.

26. The method as claimed in claim 15, wherein said barrier layer is dried in a first step, whereafter said barrier layer is cured by heat treatment at a web surface temperature of at least 170° C.

27. The method as claimed in claim 26, wherein said barrier layer is dried at a web surface temperature of 80-160° C., in a first step, whereafter said barrier layer is cured by heat treatment at a web surface temperature of at least 170° C.

28. The method as claimed in claim 27, wherein said barrier layer is dried at a web surface temperature of 140-160° C., in a first step, whereafter said barrier layer is cured by heat treatment at a web surface temperature of at least 200° C., but at most 230° C.

29. The method as claimed in claim 15, wherein the outer, liquid-tight coatings are of a thermoplastic polymer material.

30. The method as claimed in claim 15, wherein said particles of amorphous, colloidal $SiO_2$ have a particle size of at least 4 nm and at most 100 nm.

31. The method as claimed in claim 30, wherein said particles of amorphous, colloidal $SiO_2$ have a particle size of at least 5 nm, and at most 70 nm.

* * * * *